S. ARMSTRONG.
Piston-Rod Packing.
No. 216,131.　　　　Patented June 3, 1879.
Fig. 1.
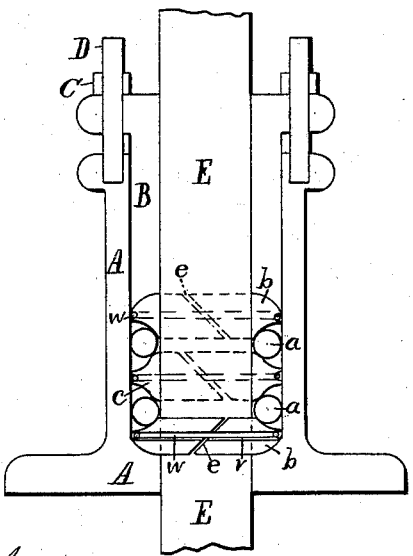
Fig. 4.　　Fig. 3.　　Fig. 2.
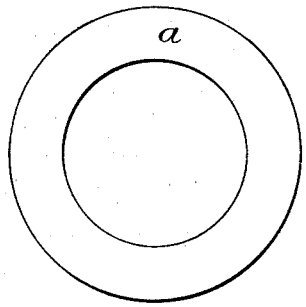 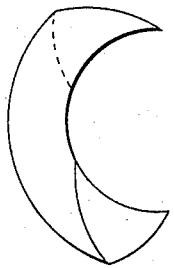 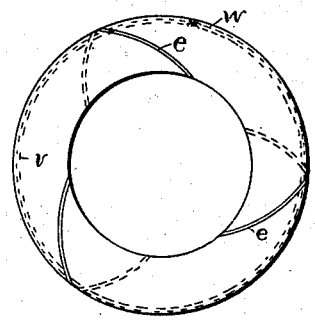
Attest:　　　　　　　　Inventor.
Thos. T. Crane.　　　　Samuel Armstrong.
J. E. Drake.　　　　　　by O. Drake, Att'y

UNITED STATES PATENT OFFICE.

SAMUEL ARMSTRONG, OF NEWARK, NEW JERSEY.

IMPROVEMENT IN PISTON-ROD PACKINGS.

Specification forming part of Letters Patent No. 216,131, dated June 3, 1879; application filed April 3, 1879.

*To all whom it may concern:*

Be it known that I, SAMUEL ARMSTRONG, of the city of Newark, in the county of Essex and State of New Jersey, have invented certain new and useful Improvements in Piston-Rod Packings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in packing for piston-rods; and consists in combining sectional with elastic rings to make a close joint, and in a special mode of shaping the sectional rings and packing the beveled joints between the sections.

Figure 1 of the drawings shows a sectional view of a stuffing-box provided with my improved packing; Fig. 2, a plan of one of the sectional packing-rings; Fig. 3, a section of such a ring detached, and Fig. 4 a plan of one of the elastic rings.

The elastic rings are made of canvas saturated and coated with plumbago and india-rubber solution, the strips of canvas being first rolled into a cord or rope, and then united by stitches into a ring or gasket, as shown in Fig. 4, the whole ring being finally coated with the composition named.

The sectional rings are shown of two shapes in Fig. 1, where $a$ $a$ are the elastic rings, $b$ the upper and lower sectional rings, and $c$ the intermediate sectional rings. The rings $b$ are rounded on one side to fit the stuffing-box A and the follower B, the other side of each being in contact with the elastic rings $a$ and beveled, so as to throw the latter out against the inside of the stuffing-box.

The central ring is beveled on both sides for a similar purpose, and the elastic rings, embraced between the outer rings, $b$ $b$, and the central rings, $c$, are forced into close contact with the stuffing-box and the sectional rings when the follower B is screwed down by the nuts C on the bolt D.

The sectional rings are made of anti-friction metal, and each is cut into three or more sections by an inclined space, (marked $e$ in Figs. 1 and 2.) This space is filled with yielding material, like india-rubber or paper, and its effect is to pack the inclined joint between the sections, while it permits them to change position a little and accommodate themselves to the other parts of the rod-packing without opening the joints $e$.

The advantages of this improvement will be apparent from its operation, which is as follows: When the follower B is screwed down upon the rings, the sectional rings force the elastic rings outward against the stuffing-box, and are themselves forced tightly against the piston-rod E, the soft rings making a close joint upon the inside of the stuffing-box, and the sectional rings with their packed joints securing a close joint against the rod E.

The soft rings, being placed against the stuffing-box, are not subjected to the wear of the piston-rod, while the packed joints in the sectional rings permit them to be closed up as they wear without leakage between the sections.

The sections are held together by wire bands $w$, wound in a groove, $v$, formed in the edge of the sectional rings, but need nothing to hold them together when in use.

Although I have shown but two of the rings $a$ in Fig. 1, with one of the rings $c$ between them, the packing may be constructed with any desired number of the rings $a$ and $c$; and I therefore claim the construction and arrangement of the rings, as follows:

1. The combination, in a piston-rod packing, of the elastic rings $a$ and a continuous series of sectional rings, $b$ and $c$, the said rings having beveled sides, and the elastic rings $a$ being applied between said beveled portions thereof, the whole arranged and operating substantially as herein set forth.

2. A piston-rod packing having the upper and lower sectional rings, $b$, and the intermediate sectional rings, $c$, all formed with inclined joints $e$, and having an elastic material between the inclines of said joints, as specified.

In testimony that I claim the foregoing I have hereunto set my hand this 28th day of March, 1879.

SAMUEL ARMSTRONG.

Witnesses:
  OLIVER DRAKE,
  I. E. DRAKE.